(12) United States Patent
Fodor

(10) Patent No.: US 7,912,473 B2
(45) Date of Patent: Mar. 22, 2011

(54) METHOD AND APPARATUS FOR ALLOCATING RADIO RESOURCES IN A MOBILE RADIO NETWORK

(75) Inventor: Gabor Fodor, Hasselby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 615 days.

(21) Appl. No.: 11/720,505

(22) PCT Filed: Apr. 29, 2005

(86) PCT No.: PCT/SE2005/000619
§ 371 (c)(1), (2), (4) Date: May 30, 2007

(87) PCT Pub. No.: WO2006/059936
PCT Pub. Date: Jun. 8, 2006

(65) Prior Publication Data
US 2008/0123600 A1    May 29, 2008

Related U.S. Application Data

(60) Provisional application No. 60/593,061, filed on Dec. 6, 2004.

(30) Foreign Application Priority Data

Dec. 3, 2004   (SE) ...................................... 0402963

(51) Int. Cl.
*H04W 72/00* (2009.01)
(52) U.S. Cl. ............... 455/452.1; 455/450; 455/451; 455/452.2; 455/453; 370/395.2; 370/395.43; 370/395.21; 370/468; 370/335; 725/93; 725/94; 725/96

(58) Field of Classification Search .................. 370/468, 370/335, 395.2–395.43; 455/450–453; 725/91–96
See application file for complete search history.

(56) References Cited

U.S. PATENT DOCUMENTS

| | | | | |
|---|---|---|---|---|
| 6,011,590 | A * | 1/2000 | Saukkonen | 375/240.05 |
| 6,393,030 | B1 * | 5/2002 | Kim et al. | 370/441 |
| 6,721,280 | B1 * | 4/2004 | Mauro et al. | 370/252 |
| 2003/0045237 | A1 * | 3/2003 | Gardner et al. | 455/63 |
| 2003/0064730 | A1 * | 4/2003 | Chen et al. | 455/453 |
| 2003/0069035 | A1 * | 4/2003 | Shurvinton | 455/522 |

FOREIGN PATENT DOCUMENTS

WO    WO 9507578 A1    3/1995

OTHER PUBLICATIONS

E. Altaian, "Capacity of Multi-Service Cellular Networks with Transmission-Rate Control: A Queuing Analysis", ACM Mobicom '02, Atlanta, GA, Sep. 23-28, 2002.
Gábor Fodor and M. Telek, "Performance Analysis of the Uplink of a CDMA Cell Supporting Elastic Services", Conference proceedings of the 2005 IFIP Networking Conference held at the University of Waterloo, Ontario, Canada, May 2-6, 2005.

* cited by examiner

*Primary Examiner* — Jinsong Hu
*Assistant Examiner* — Dung Hong

(57) ABSTRACT

A method and apparatus for allocating radio resources to an elastic session in a cell in a CDMA network is presented. The method comprises allocating, to the elastic session, a radio resource share corresponding to a reduced transmission rate wherein the reduction in transmission rate corresponds to a peak transmission rate of the elastic session being slowed down by a first slowdown rate. The first slow down rate is determined in dependency of the transmission rate requirements of the ongoing sessions in the cell in a manner so that the radio resource share allocated is not lower than a radio resource share corresponding to the maximum transmission rate if a total amount of resources available for allocation to ongoing sessions in the cell is sufficient for all ongoing sessions to transmit at a respective peak transmission rate.

15 Claims, 9 Drawing Sheets

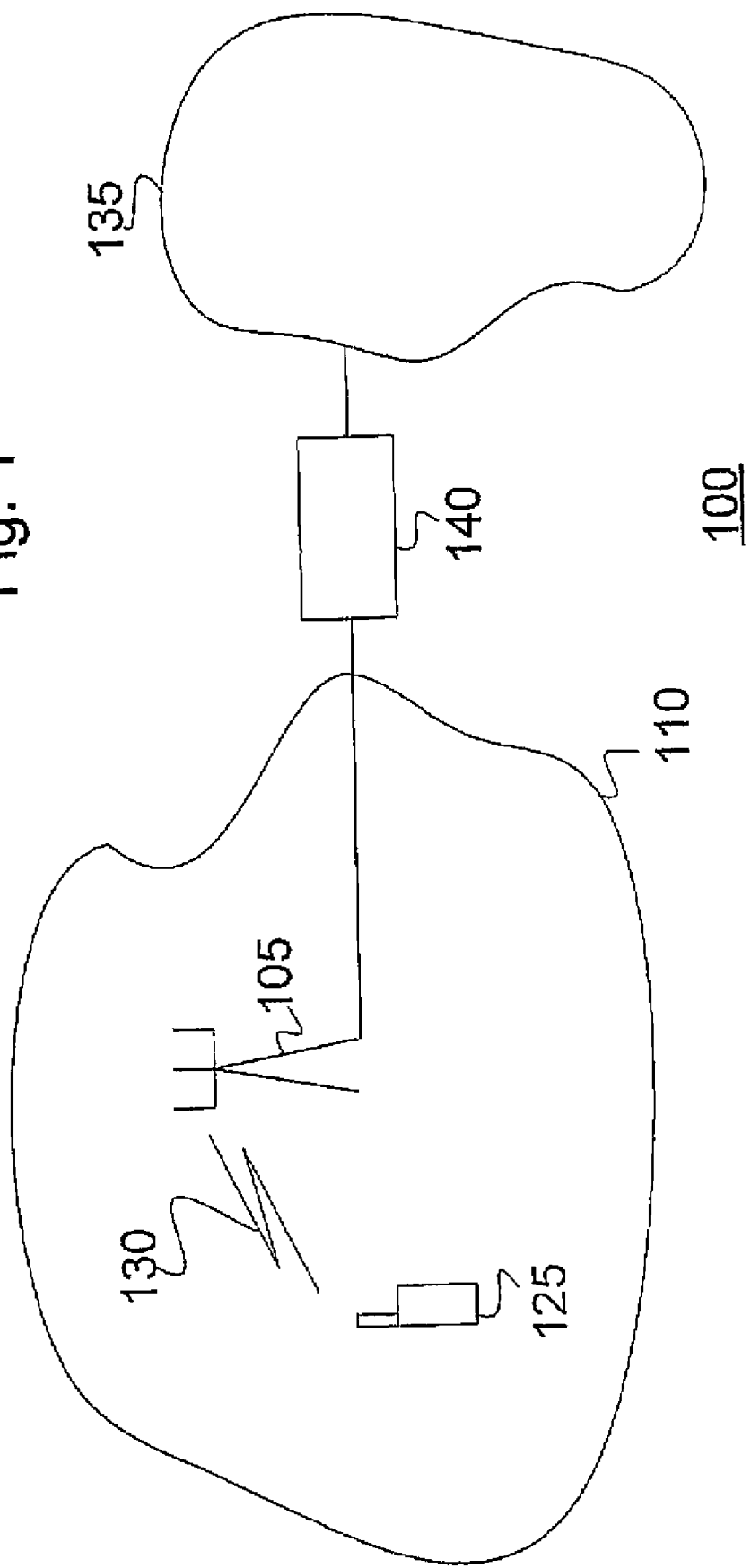

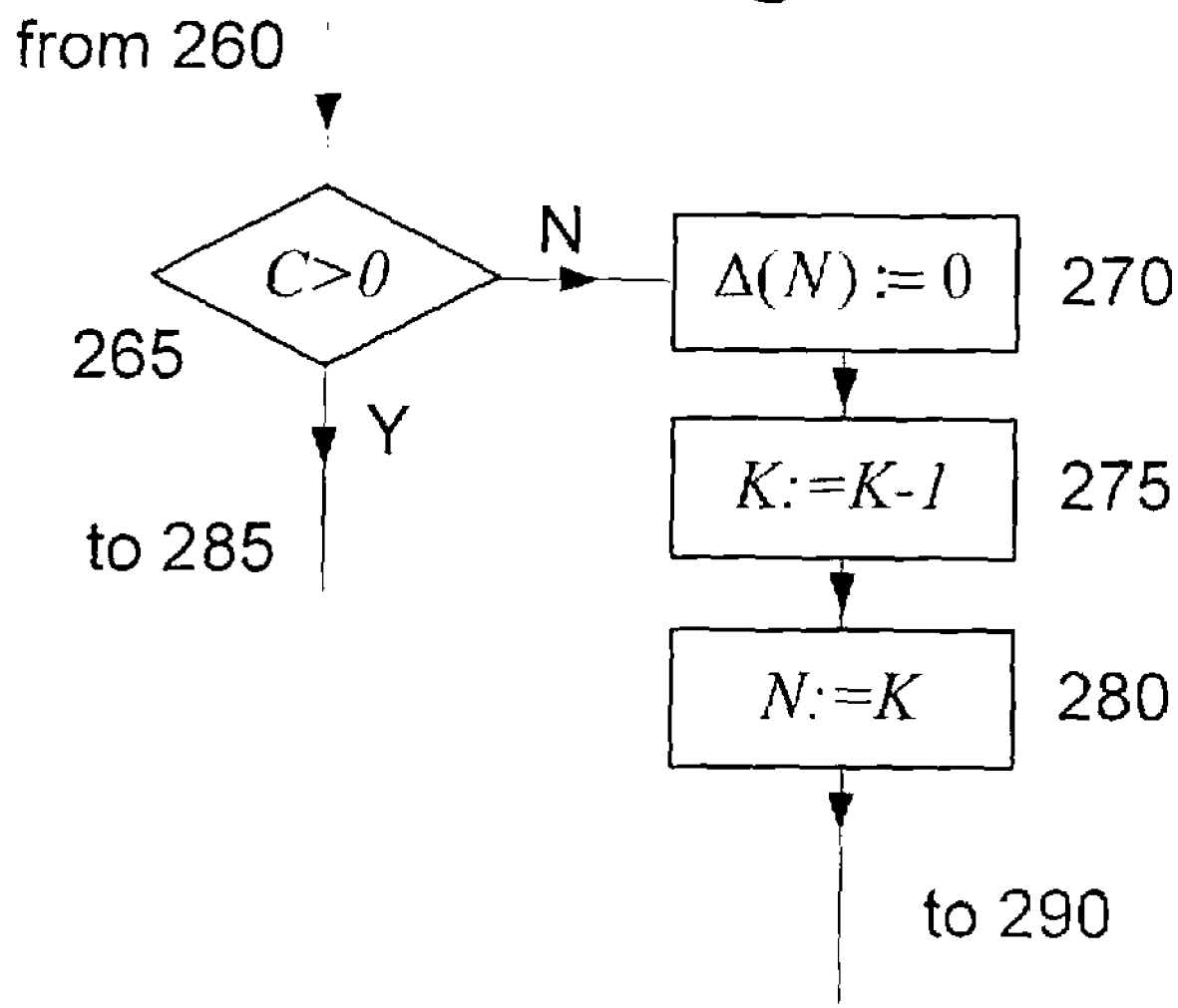

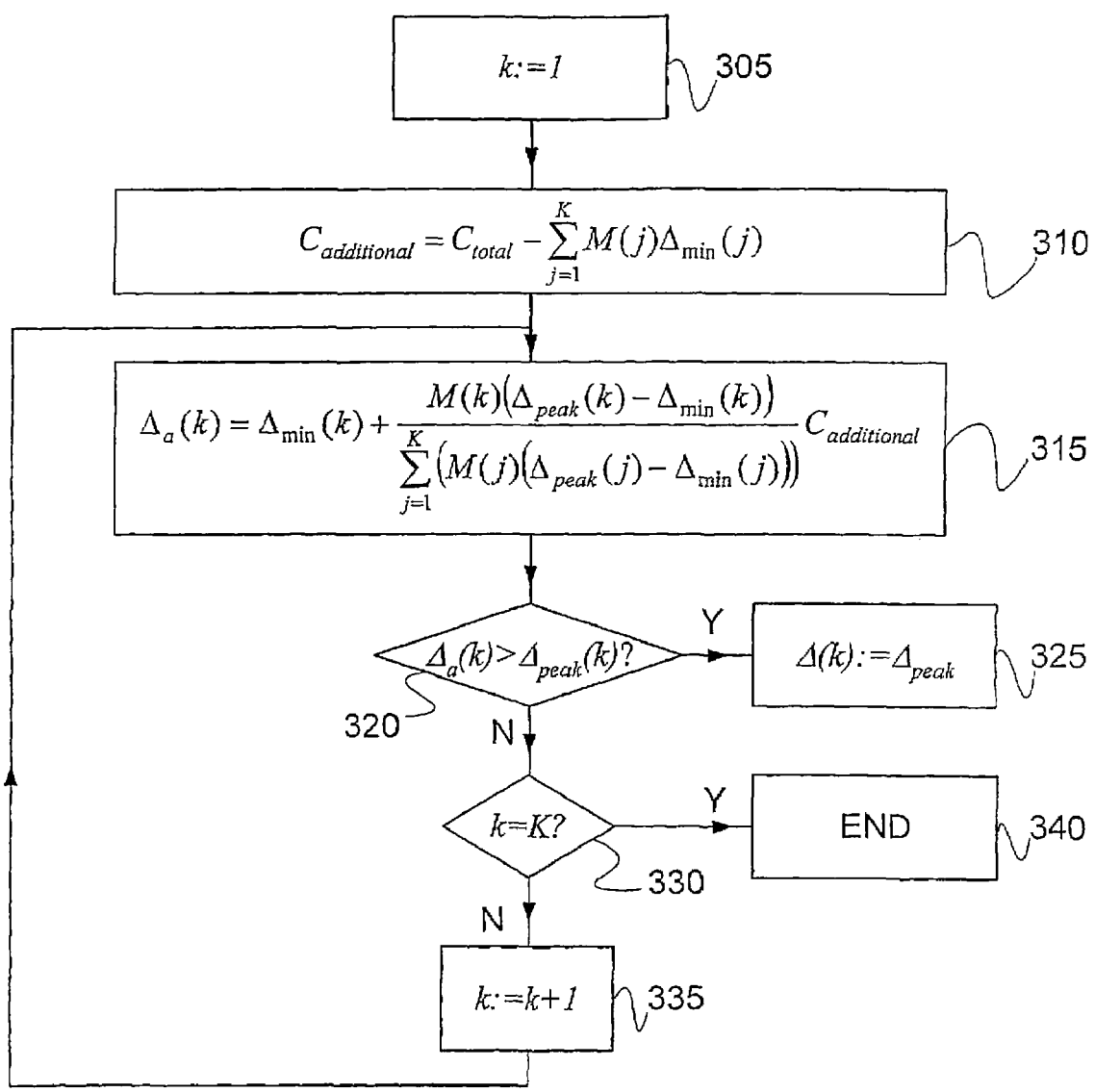

TABLE I

| Parameter | Value |
|---|---|
| $\Delta(1)$ | $2\cdot\Delta$ |
| $\Delta(2)$ | $3\cdot\Delta$ |
| $\Delta(3)$ | $3\cdot\Delta$ |
| $\hat{a}(1)$ | 1 |
| $\hat{a}(2)$ | 3 |
| $\hat{a}(3)$ | 1…6 |
| $\lambda(1)$ | $2\cdot\lambda$ |
| $\lambda(2)$ | $1.333\cdot\lambda$ |
| $\lambda(3)$ | $1.333\cdot\lambda$ |

METHOD AND APPARATUS FOR ALLOCATING RADIO RESOURCES IN A MOBILE RADIO NETWORK

This application claims the benefit of U.S. Provisional Application No. 60/593,061, filed Dec. 6, 2004, the disclosure of which is fully incorporated herein by reference.

FIELD OF THE INVENTION

The present invention relates to mobile radio communication in general, and in particular to a method and apparatus for allocating radio resources in a mobile radio communication network operating according to the principles of code division multiple access (CDMA).

BACKGROUND

The radio bandwidth allocated to a mobile radio network is limited. In a mobile radio network, the number of ongoing calls and/or data transfer sessions and the rate by which bits are transferred in the ongoing calls/data transfer sessions are limited by the radio bandwidth that has been allocated to the mobile radio network. Since radio bandwidth is a scarce resource, there is a need for utilizing the bandwidth allocated to a mobile radio network as efficiently as possible.

In a mobile radio network operating according to the principles of CDMA, the maximum transmission capacity available in the network is tightly coupled to the amount of interference in the air interface. By keeping the transmission power of a session low, the interference experienced by other sessions will be low, and the impact of the session on the maximum available transmission capacity will be limited.

In E. Altman, "*Capacity of Multi-Service Cellular Networks with Transmission-Rate Control: A Queuing Analysis*", ACM Mobicom '02, Atlanta, Ga., Sep. 23-28, 2002, it is shown that by reducing the transmission rate of all best effort sessions in a CDMA network by a slowdown rate a, the capacity of the network increases, despite the fact that a slower transmission rate implies a longer holding time for each session (assuming that the same amount of information is transferred regardless of transmission rate).

SUMMARY

A problem to which the present invention relates is how to improve the utilization of the radio resources allocated to a mobile radio network operating according to the principles of code division multiple access.

This problem is addressed by a method of allocating radio resources to an elastic session transmitted over a radio interface between a radio base station involved in a plurality of ongoing sessions and a mobile station in a mobile radio network operating according to code division multiple access. The method comprises:
  allocating, to the elastic session, reduced radio resources corresponding to a reduced transmission rate wherein the reduction in transmission rate corresponds to a peak transmission rate of the elastic session being slowed down by a first slowdown rate; and
  determining the first slow down rate in dependency of the transmission rate requirements of the ongoing sessions in a manner so that the radio resource share allocated is not lower than a radio resource share corresponding to the maximum transmission rate if a total amount of resources available for the radio base station to allocate to ongoing sessions is sufficient for all ongoing sessions to transmit at a respective peak transmission rate.

By determining the first slow down rate in dependency of the transmission rate requirements of the ongoing sessions in the manner described above, it is achieved that slow down of transmission rates can be restricted to situations when slow down is necessary in order to increase the capacity of the system. Slow down of elastic sessions will only have to be performed to the extent necessary in order for the amount of radio resources utilised by the sessions to fall within the total amount of radio resources available for allocation to the sessions. When the amount of radio resources available for allocation to the sessions involving the radio base station is sufficient for all sessions to transmit at their respective peak transmission rate, no slow down will have to be performed.

Hence, the utilisation of the available radio resources is optimised.

In one aspect of the invention, the determining further comprises ensuring that the reduced transmission rate is not lower than a minimum transmission rate of the elastic session. Hereby is achieved that elastic sessions performing real time transmissions of data can be slowed down without risking that the slow down is performed to an extent where an unacceptable real time transmission rate is reached.

In one embodiment of the invention, in which the elastic session belongs to one of at least two session classes, the first slow down rate is determined in accordance with a priority policy according to which different session classes are given different priority and sessions of a higher priority class are allocated radio resources corresponding to a reduced transmission rate only if a reduction of transmission rate of sessions of session classes of lower priority is not sufficient.

In this embodiment, it is possible to allow sessions of high priority to transmit at a high transmission rate even if the total amount of resources available for the ongoing sessions is not sufficient for each session to transmit at its peak transmission rate.

In another embodiment, the first slow down rate is determined in accordance with a priority policy according to which, if a total amount of resources available for allocation to sessions involving the radio base station is not sufficient for each ongoing session to transmit at its peak transmission rate, the transmission rate of each ongoing session is slowed down with a slow down rate.

In one aspect of the invention, the allocating of resources to the elastic session is performed upon an indication indicating that a total amount of resources available for allocation to ongoing sessions is not sufficient for all ongoing sessions to operate at their respective peak transmission rate. Hereby is achieved that an elastic session can transmit at its peak transmission rate at least until the resources available for allocation to ongoing sessions is not sufficient In another aspect of the invention, the allocating of resources to the elastic session is performed upon the entry of a new session involving the radio base station. The entry of a new session will change the total amount of resources available for allocation, as well as the number of ongoing sessions, and an updating of the radio resource shares allocated to ongoing sessions could advantageously be performed.

In yet another aspect of the invention, the allocating of resources to the elastic session is performed in response to an indication indicating that a total amount of resources available for allocation to ongoing sessions involving the radio base station has changed. Hence, if the radio resources available for allocation to ongoing sessions is changed, the radio resource shares allocated to the ongoing sessions can be adjusted accordingly.

The problem is further addressed by a computer program operable to execute the inventive method, a radio network node comprising a computer arrangement arranged to execute the inventive computer program, and a mobile radio network comprising the inventive radio network node.

In one embodiment of the invention, a method of optimising the utilisation of radio resources available for allocation by a radio base station to sessions upheld between the radio base station and mobile stations in a mobile radio network operating according to code division multiple access is provided. This method comprises:

checking whether the radio resources available for allocation are sufficient for all upheld sessions to transmit data at a respective peak transmission rate;

if so, allocating to the upheld sessions a respective radio resource share allowing transmission at least the respective peak transmission rate; and if not, allocating to at least one upheld elastic session a reduced radio resource share allowing for transmission at a respective reduced transmission rate corresponding to the respective peak transmission rate having been slowed down by a respective slow down rate; wherein the at least one respective slow down rates is selected in a manner so that the radio resource share allocated to the at least one upheld elastic session allows for transmission at least a minimum transmission rate of the elastic session and so that the radio resources available for allocation are fully utilised by the upheld sessions.

In this embodiment, the reduced radio resource share allocated to at least one upheld session can be determined according to a number of different priority policies, as is further discussed below.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 schematically illustrates a mobile radio network.

FIG. 2b is a flowchart illustrating some additional steps which could be included in the process of FIG. 2a if no admission control is applied in the mobile radio network.

FIG. 3 is a flowchart schematically illustrating another resource allocation procedure in which no sessions are given priority over other sessions.

FIG. 5b illustrates numerical results of blocking probabilities vs. maximum slowdown rate in a cell where resource allocation is performed according to the embodiment of FIG. 2a.

Figure 5A:
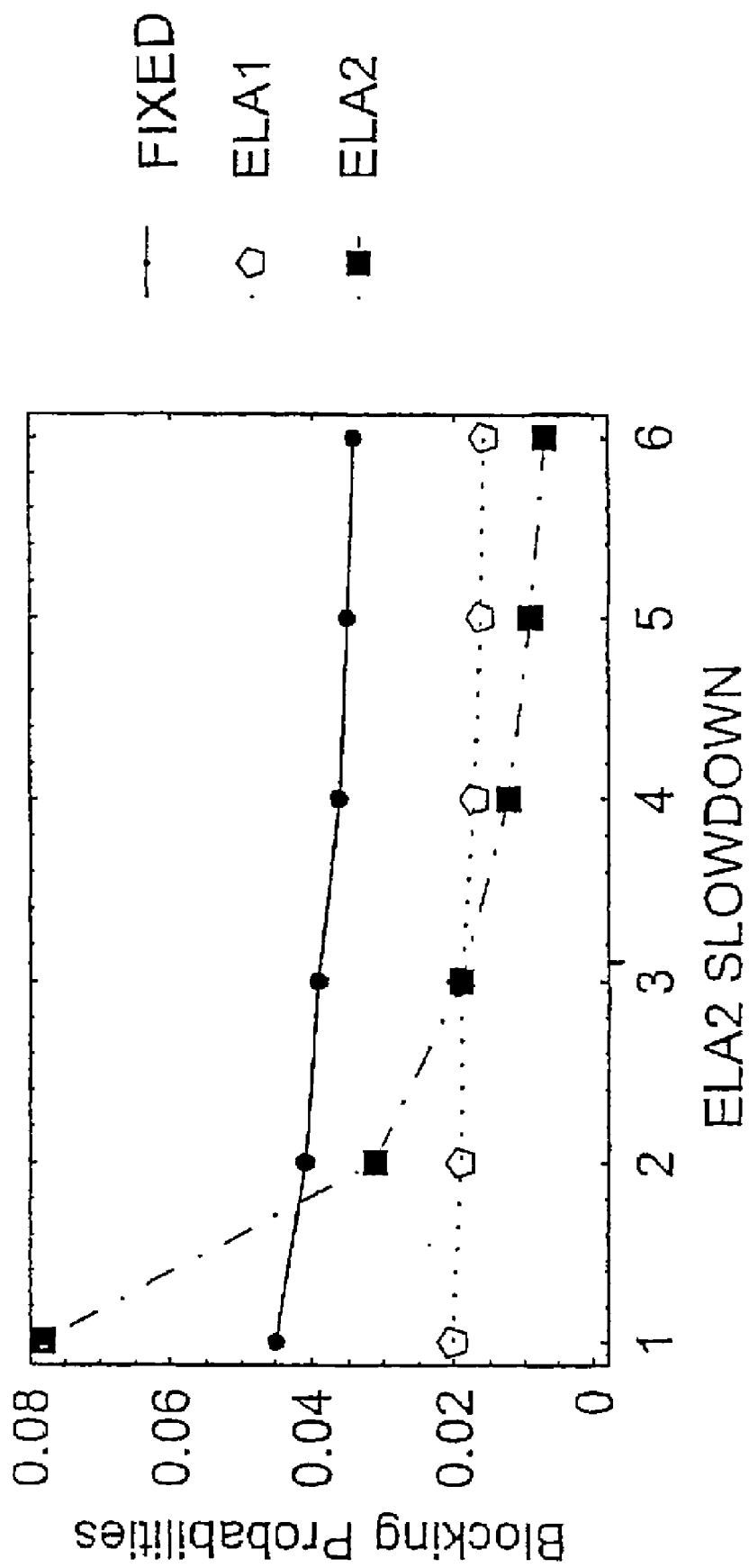
FIG. 5a illustrates numerical results of blocking probabilities vs. slowdown rate for a system of three different session classes in a cell where the slow down rate a is fixed.
Figure 5B:
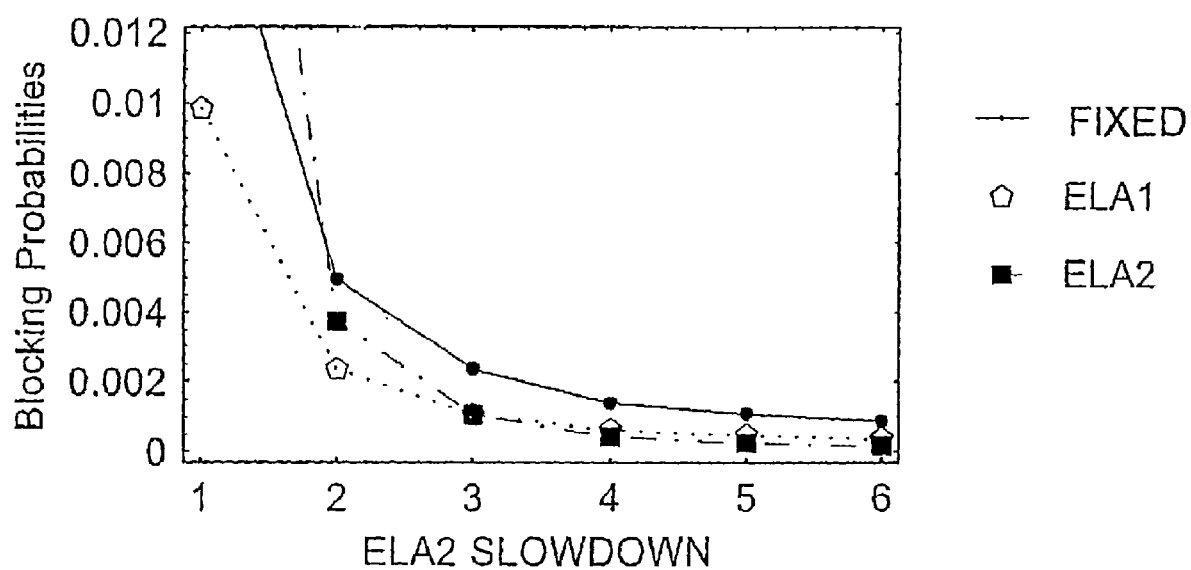
Figure 5C:
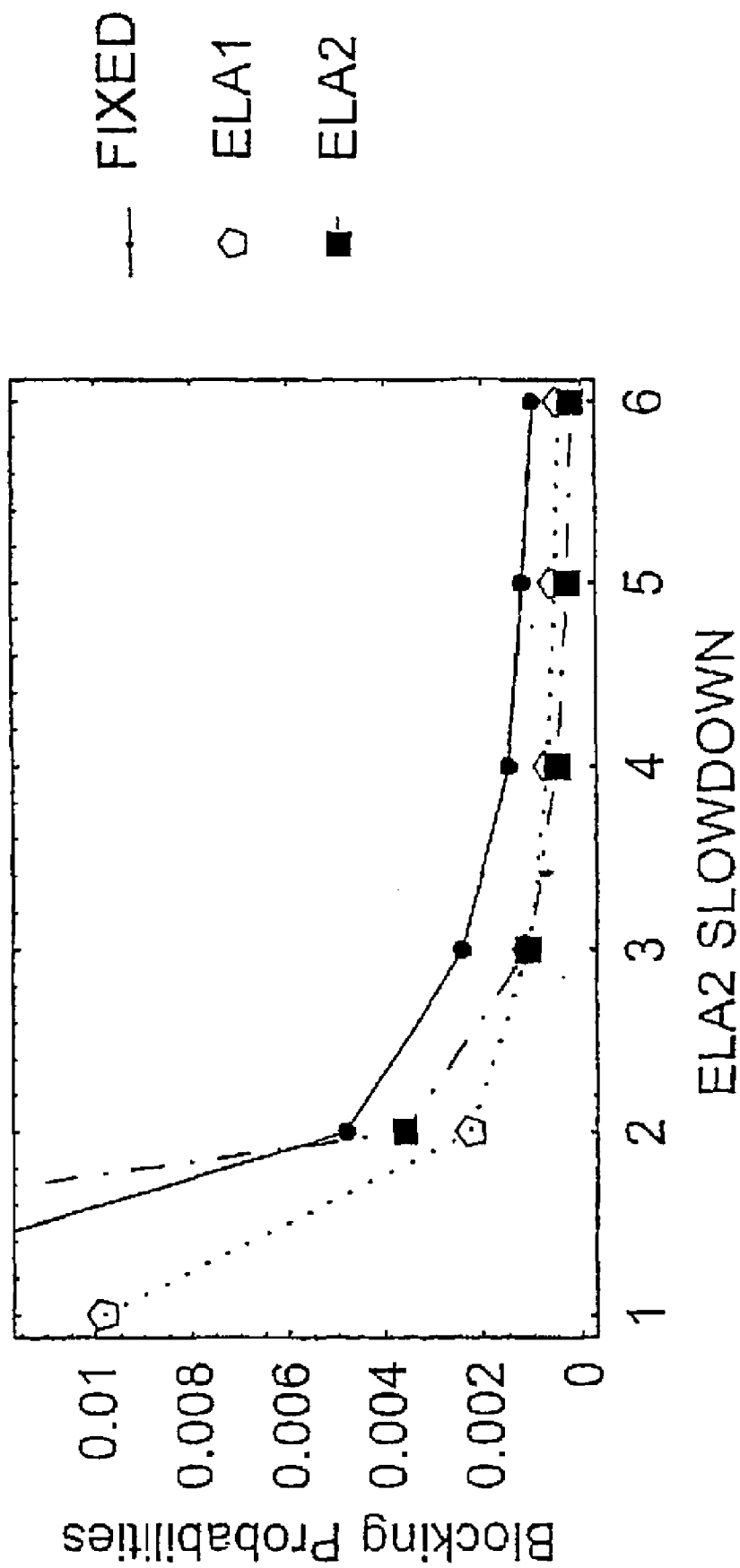
FIG. 5c illustrates numerical results of blocking probabilities vs. maximum slowdown rate in a cell where the resource allocation is performed according to the embodiment of FIG. 3.

Table 1 shows numerical values used in the calculations presented in FIGS. 5a-c.

DETAILED DESCRIPTION

A schematic illustration of a mobile radio network 100 operating according to the principles of code division multiple access (CDMA) is shown in FIG. 1. Mobile radio network 100 will in the following be referred to as CDMA network 100. A CDMA network 100 generally comprises a number of radio base stations 105, where each base station 105 serves a geographical area referred to as a cell 110. A base station 105 typically comprises an antenna and a radio transceiver for communicating with mobile stations 125 in the cell 110 over a radio interface 130. The base station 105 is generally connected to a core network 135 via a radio network control node 140. The radio network control node 140 typically comprises software and hardware for controlling the radio base station 105. The radio network control node 140 is often referred to as a radio network controller (RNC) or a base station controller (BSC).

The radio interface 130 can typically be used for voice calls, as well as for data transfer sessions. In the following, calls, as well as data transfer sessions, will be referred to as sessions. Different sessions in the same cell could involve communication between the same mobile station 125 and a radio base station 105, or between different mobile stations 125 and the radio base station 105.

In a CDMA network 100, a base station 105 can simultaneously transmit data relating to several ongoing sessions by use of the same radio frequency band. However, in order to ensure that each ongoing session receives sufficient quality of service, the power levels and the transmission rates of the ongoing sessions are kept at a level so that interference effects resides below tolerable levels.

In a typical CDMA network 100, different sessions can be transmitted at different transmission rates. Moreover, for some sessions, the rate by which bits are transmitted can vary during an ongoing session. Such sessions can be referred to as elastic sessions. For other sessions, the rate by which bits are transmitted is fixed, such as for circuit switched fax sessions and calls where a mobile station 125 can only transmit and receive data at a specified transmission rate employing implicit or explicit transmission rate control mechanisms.

Elastic sessions may be divided into two groups: So called best effort services, i.e. non-real-time elastic session by which a fixed amount of data is to be transferred and for which a slow down will imply a longer holding time, and real-time elastic sessions, where the transmission rate may be reduced at the expense of quality of service, and for which a slow down will normally not imply a longer holding time. Examples of non-real-time elastic sessions are packet switched fax sessions and data transfer sessions where data is transferred by use of the TCP protocol, USD (User Diagram Protocol), Datagram Congestion Control Protocol or similar protocols. Examples of real-time elastic sessions are calls where a mobile station 125 uses a voice coder allowing a flexible voice coding, such as an Adaptive Multirate (AMR) codec, and real-time data transfer sessions wherein the transmission rate can be adapted, such as e.g. sessions by which video information is transferred by use of a video codec that can adapt the transmission rate.

The capacity of a CDMA network 100 can be measured as the average number of sessions receiving service at a given time with a given level of quality. By slowing down the transmission rates of all ongoing non-real-time elastic sessions in a cell by a fixed slow down rate a, the capacity of a CDMA cell 110 can increase, as is shown in E. Altman, "Capacity of Multi-Service Cellular Networks with Transmission-Rate Control: A Queuing Analysis", ACM Mobicom '02, Atlanta, Ga., Sep. 23-28, 2002, hereby incorporated by reference. The slow down rate a is a factor by which the transmission rate of all sessions is slowed down. Although each elastic session in a CDMA network 100 which applies a fixed slow down rate a is served at a lower transmission rate than if no slow down rate was applied, the number of ongoing sessions can increase, and the total amount of information that can be simultaneously transmitted by the CDMA network 100 is increased.

An elastic session typically has a peak transmission rate, $R_{peak}$, which is the maximum transmission rate at which the elastic session can operate, and a minimum transmission rate, $R_{min}$, which is the minimum transmission rate at which the elastic session can operate. A group of sessions which have the same peak transmission rate, $R_{peak}$, and the same minimum transmission rate, $R_{min}$, as well as the same normalized signal energy per bit requirement, $E/N_0$, will hereinafter be referred to as a session class. E denotes the required received signal energy per bit for the receiving party to discern the information, and $N_0$ denotes the noise spectral density.

At many times, the number of ongoing sessions in a CDMA network 100 is low enough for each elastic session to operate at its peak transmission rate, $R_{peak}$. Thus, in such instances, by slowing down of all non-real-time elastic sessions by a fixed slow down rate a, the radio resources would not be utilized in an optimal way. Rather, since each session which has been slowed down by the fixed slowdown rate a will often be active for a longer period of time than if no slow down had been applied, in order to transmit the same amount of information, the radio bandwidth occupied by the session will be occupied for longer, and other mobile stations 125, which request the start of a session during the extra residency time of the ongoing sessions, may have to be turned down or may not be served at the requested transmission rate.

According to the invention, the slow down of a session in a cell 110 can be made dependent on the required transmission rate of the other ongoing sessions in the cell 110. In other words, the allocation of resources to an elastic session served by a base station 105 is made in dependency of the resource requirements of the other ongoing sessions served by the base station 105. Furthermore, according to the invention, the maximum possible slow down of a session should advantageously be restricted so that the resulting reduced transmission rate, $R_a$, does not go below the minimum transmission rate, $R_{min}$, of the session. Hence, a slow down can successfully be applied to real-time elastic sessions as well as to non-real-time elastic sessions.

The allocation of resources to an elastic session is preferably not static, but can advantageously be reviewed and updated. Such updating can e.g. take place upon the start of a new session served by the same base station 105, upon handover between the same base station 105 and another base station, and upon termination of another session served by the same base station 105. By the inventive method, the total amount of resources, $C_{total}$, that are available for allocation to sessions within the cell 110 are distributed between ongoing sessions in a manner so that the amount of resources allocated to a single session, and thereby also the overall resource utilization, is optimised in accordance with a priority policy, as is further discussed below.

As mentioned above, the transmission rate by which information can be transmitted over a session depends on the transmission power of the session, or, more correctly, on the power received by the receiving party of the session. Let $\tilde{\Delta}(R)$ denote the minimum ratio of the received power and the total interference energy at the receiving party that is required in order for a session to transmit at a transmission rate, R. $\tilde{\Delta}$ can then be expressed as:

$$\tilde{\Delta}(R) = \frac{E}{WN_0}R, \quad (1)$$

where E is the required received signal energy/bit for the session, $N_0$ is the thermal noise density and W is the spread spectrum bandwidth. In the following, the minimum ratio $\tilde{\Delta}(R)$ required for transmission at peak transmission rate, $R_{peak}$, of will be denoted $\tilde{\Delta}_{peak}$.

Hence, the power P received by the base station 105 from a mobile station 125 transmitting a session at transmission rate R must fulfil the following relationship:

$$\frac{P}{P_{noise} + I_{own} + I_{other} - P} = \tilde{\Delta}(R), \quad (2)$$

where $P_{noise}$ is the background noise power, $I_{own}$ is the total power received by base station 105 within its own cell 110, and $I_{other}$ is the total power received by base station 105 from other cells 110.

By introducing the relationship $$\Delta = \frac{\tilde{\Delta}}{1 + \tilde{\Delta}} \quad (3)$$

equation (2) can be re-written as:

$$\frac{P}{P_{noise} + I_{own} + I_{other}} = \Delta(R). \quad (4)$$

$\Delta(R)$ is a measure of the share of the total resources allocated within a cell 110 that are allocated to a session, and will in the following be referred to as the resource share, $\Delta$, of a session. If the resource share, $\Delta$, allocated to a session is reduced, the maximum transmission rate at which the session can transmit information is also reduced, as is clear from equations (1) and (3). The resource share $\Delta$ required for a session to transmit at peak transmission rate, $R_{peak}$, will in the following be referred to as the peak resource share, $\Delta_{peak}$, of the session.

The slow down rate a, as mentioned above, can be defined as:

$$a = \frac{R_{peak}}{R_a}, \quad (5)$$

where $R_a$ denotes the reduced transmission rate resulting from the slow down. Since $R_{peak}$ varies between session classes, the reduced transmission rate, $R_a$, resulting from a slow down by the slow down rate a, will vary between session classes. Hence, the maximum slow down rate of a session, $a_{max}$, corresponds to the minimum transmission rate, $R_{min}$ of the session.

From equations 1, 3 and 5, the following relation between Δ and a can be derived:

$$a = \frac{\Delta_{peak}(1-\Delta_a)}{\Delta_a(1-\Delta_{peak})}, \quad (6)$$

where $\Delta_a$ denotes the resource share required by a session transmitting at a reduced transmission rate $R_a$, and will be referred to as the reduced resource share.

As can be seen from equation 1 and 3, the resource share Δ depends on the required signal energy per bit, E. Since the required signal energy per bit often varies between session classes, the resource share Δ required to transmit at a transmission rate R often vary between session classes. Hence, in order to indicate the possible dependency of session class, any resource share Δ will hereinafter be denoted Δ(k), where k denotes a session class.

It is well known that a CDMA network 100 cannot operate beyond its pole capacity, which defines the theoretical maximum load of the system. The pole capacity, $C_{pole}$, can be defined as:

$$C_{pole} = \frac{1}{1 + \frac{I_{other}}{I_{own}}} \quad (7)$$

In a cell 110 which supports sessions of K different session classes 1, ... K, the total load Ω experienced by the cell 110 can be expressed as:

$$\Omega = \sum_{k=1}^{K} M(k)\Delta(k) \quad (8)$$

where M(k) denotes the number of active sessions belonging to session class k. In order to avoid total transmission failure within the cell 110, the total load Ω must be kept below the pole capacity, $C_{pole}$.

In the following, the total amount of radio resources available for allocation to sessions within a cell 110 will be referred to as the total amount of resources available for allocation, $C_{total}$. As long as $C_{total}$ is kept below the pole capacity, $C_{pole}$, any measure of $C_{total}$ may be used. A CDMA system 100 often operates with a $C_{total}$ well below the pole capacity.

In one embodiment of the invention, the allocation of radio resources in the CDMA network 100 is made in accordance with a priority policy where some session classes are given higher priority than other session classes. Hence, if the total amount of resources, $C_{total}$, available for allocation to sessions served by a base station 105 is not sufficient for each session to operate at its peak transmission rate, $R_{peak}$, sessions of lower priority will be slowed down first. Only if the slow down of the lower priority session classes is not sufficient will slow down of the higher priority session classes be considered. An example of a method of allocating resources to sessions in this embodiment is illustrated in FIG. 2, which will be further discussed below.

In another embodiment of the invention, the allocation of radio resources in the CDMA network 100 is made in accordance with a priority policy where all elastic session classes are given the same priority. Hence, if the total amount of resources available for allocation to sessions served by a base station 105 is not sufficient for each session to operate at its peak transmission rate, $R_{peak}$, all sessions are slowed down, but only as much as is necessary. However, the slow down rate, a, may vary between different session classes. An example of a method of allocating radio resources to sessions in this embodiment is illustrated in FIG. 3, which will also be further discussed below.

Figure 2A:
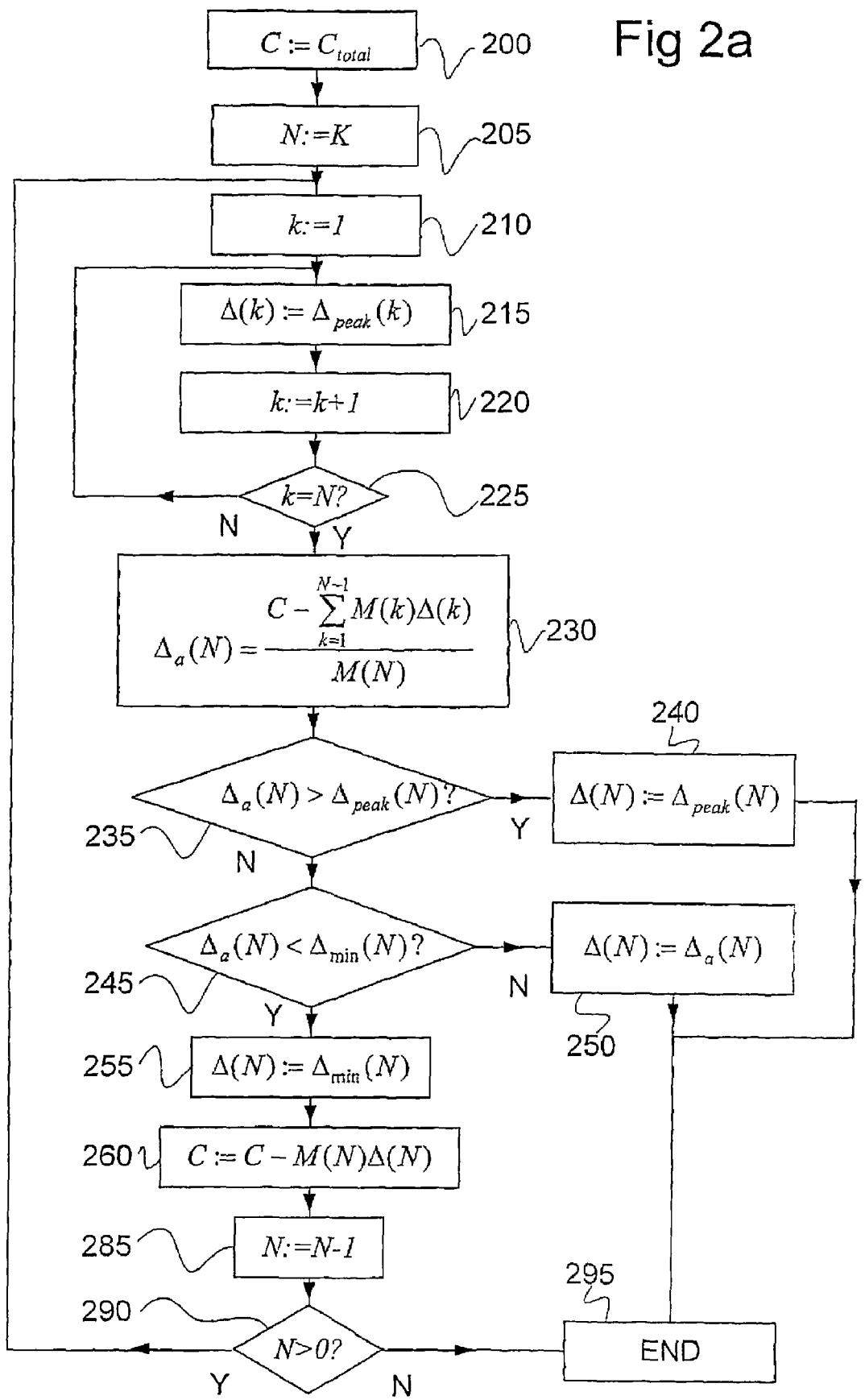
FIG. 2a is a flowchart schematically illustrating a resource allocation procedure in which some session classes are given higher priority than other session classes.

In the embodiment of FIGS. 2a and 2b, some session classes k are given higher priority than other session classes. If the total amount of resources available for allocation, $C_{total}$, is not sufficient for all ongoing sessions to transmit at their respective peak transmission rate, $R_{peak}$, sessions of the lowest priority will be slowed down. Only if this slow down is not sufficient will sessions of the next lowest priority be slowed down, and so forth. In the example of FIGS. 2a and 2b, base station 105 supports K different session classes 1, ... K, wherein session class K has lowest priority and session class 1 has the highest priority.

The method illustrated in FIG. 2a assumes that admission control is applied in the CDMA system 100, so that a new session is only admitted if the total amount of radio resources, $C_{total}$, is large enough for each ongoing session to transmit at its minimum transmission rate, $R_{min}$, or a higher transmission rate.

In step 200 of FIG. 2a, a parameter representing the resources available for allocation, C, is given the value of $C_{total}$. In step 205 of FIG. 2a, a counter N is set to a value representing the session class having the lowest priority: K. In steps 215-225, the resource share of sessions of class k, Δ(k), is set to the peak resource share, $\Delta_{peak}(k)$, for session classes 1 to N−1. $\Delta_{peak}(k)$ is the required resources share per session of session class k required for supporting transmission at the peak transmission rate, $R_{peak}(k)$, of sessions of session class k. In step 210, a counter k is set to 1. In step 215, Δ(k) is set to $\Delta_{peak}(k)$. In step 220, the counter k is incremented by 1. In step 225, it is checked whether the value of counter k is equal to the value of counter N. If not, step 215 is re-entered.

However, if the value of counter k has reached the value of N, then step 230 is entered, in which a reduced share of resources, $\Delta_a(k)$, is calculated for sessions of the Nth session class. This is done by adding the resource shares, Δ, allocated to all sessions of session classes 1 to N−1, and subtracting this sum from the total amount of resources, $C_{total}$. The value thus obtained corresponds to the resource share available to allocate to sessions of session class N. This value is then divided by the number of sessions of session class N, M(N), in order to obtain the reduced resource share, $\Delta_a(N)$ of sessions of session class N.

Step 235 is then entered, in which the calculated reduced resource share of session class N, $\Delta_a(N)$, is compared to the peak resource share, $\Delta_{peak}(N)$, of session class N. If this comparison shows that the reduced resource share, $\Delta_a(N)$, is larger than the peak resource share, $\Delta_{peak}(N)$, then step 240 is entered, in which the resource shares allocated to sessions of session class (N), Δ(N), is set to the peak resource share, $\Delta_{peak}(N)$. Hence, in this scenario, all sessions are allocated their peak resource share, $\Delta_{peak}$, and all sessions can transmit at their peak transmission rate, $R_{peak}$. Step 295 is then entered, in which the process ends.

However, if it is found in step 235 that the reduced resource share of session class N, $\Delta_a(N)$, is not larger than the peak resource share, $\Delta_{peak}(N)$, then step 245 is entered, in which the reduced resource share, $\Delta_a(N)$, is compared to the minimum resource share of sessions of session class N, $\Delta_{min}(N)$. $\Delta_{min}(k)$ is the resource share required for a session of session class k in order to support transmission at minimum transmission rate of session class k, $R_{min}(k)$. If in step 245 it is found that the reduced resource share, $\Delta_a(N)$, is larger than or equal to the minimum resource share, $\Delta_{min}(N)$, then step 250 is entered, in which the resource share of sessions of session class N, $\Delta(N)$, is set to the value of the reduced resource share of sessions of session class N, $\Delta_a(N)$. Hence, in this scenario, all session classes but session class N can transmit at their peak transmission rate, $R_{peak}$. The sessions of resource class N will be slowed down by a slow down rate a(N), and will hence transmit at a reduced transmission rate, $R_a(N)$. Step 295 is then entered, in which the process ends.

However, if it is found in step 245 that the reduced resource share of sessions of session class N, $\Delta_a(N)$, is smaller than the minimum resource share of sessions of session class N, $\Delta_{min}(N)$, then step 255 is entered, in which the resource share allocated to sessions of session class N, $\Delta(N)$, is set to the minimum resource share of session class N, $\Delta_{min}(N)$. In this scenario, the reduction of resources allocated to sessions of session class N to the minimum share of resources for this class is not sufficient, but a reduction of the resources allocated to at least one session class of a higher priority will also have to be made. Hence, step 260 is then entered, in which the resources allocated to sessions of session class N, i.e. M(N) $\Delta(N)$, is subtracted from the amount of resources available for allocation, C, in order to determine the amount of resources available for allocation to the session classes 1 to (N−1). Step 285 is then entered, in which the counter N is reduced by 1. In step 290, it is then checked whether the value of counter N is larger than 0, and if so, step 210 is re-entered, and the process is repeated with a new value of N. If the check in step 290 finds that the value of counter N is zero, then the process ends in step 295.

One or more session classes supported by cell 110 of CDMA network 100 may require a fixed transmission rate, as discussed above. If so, in order to reduce the number of performed calculations, the resources required to support sessions of this fixed rate session class(es) can be subtracted from the amount of resources available for allocation, C, in step 200. Alternatively, such fixed rate session classes could be treated as an elastic session class of any priority, having the same value of $\Delta_{peak}$ and $\Delta_{min}$.

In a CDMA system 100 where a new/newly handed over session of a session class of high priority is given higher priority than an ongoing session of lower priority, the admission control performed prior to performing the method of FIG. 2a, as discussed above, could be replaced by the additional steps of the method of FIG. 2a presented in FIG. 2b. Step 265 of FIG. 2b can then be performed upon exit of step 260 of FIG. 2a. In step 265, it is checked if the new value of C, i.e. the amount of resources available to allocation to session classes of higher priority than N, is greater than zero. If not, the resource share, $\Delta$, allocated to session class N, is set to zero in step 270. In step 275, the counter K, representing the session class of the lowest priority for which transmission can be allowed, is reduced by 1, since the total amount of resources is not sufficient to support transmission of all original session classes. Step 280 is then entered, in which the counter N is set to the value of K. Step 290 of FIG. 2a is entered. However, if in step 265 of FIG. 2b it is found that the new value of C is larger than zero, then step 285 of FIG. 2a is entered.

In an implementation of the invention in which the admission control of FIG. 2b is implemented, a check could be introduced, after all the classes have been allocated their resource shares, $\Delta$, as to whether any of the allocated resource shares, $\Delta$, have been set to zero. If so, it could be checked whether there are any residual resources available. If so, these residual resources could be allocated to some of the sessions of the session class for which $\Delta$ has been given the value zero.

In another embodiment of the invention, all elastic session classes are given the same priority. An example of a method of allocating radio resources to sessions in this embodiment is illustrated in FIG. 3. The method of FIG. 3 applies to the situation where the CDMA cell 110 supports sessions of K different session classes, referred to as class 1, ..., K. The allocation of resources in such a cell 110 where all elastic session classes are given the same priority is not trivial, since the minimum and maximum transmission rates, $R_{min}$ and $R_{peak}$, may vary between classes, and it is possible that $R_{min}$ of one class is greater than $R_{peak}$ of another class.

In step 300, a counter k is given the value 1. In step 310, the amount of additional resources, $C_{additional}$, which would be available if all sessions were to be allocated their minimum share of resources, $\Delta_{min}$ is determined according to $$C_{additional} = C_{total} - \sum_{j=1}^{K} M(j)\Delta_{min}(j)$$

Step 315 is then entered, in which a reduced share of resources, $\Delta_a$, to be allocated to the sessions of session class k is determined according to the following relation:

$$\Delta_a(k) = \Delta_{min}(k) + \frac{M(k)(\Delta_{peak}(k) - \Delta_{min}(k))}{\sum_{j=1}^{K}(M(j)(\Delta_{peak}(j) - \Delta_{min}(j)))} C_{additional}, \quad (9)$$

so that the sessions of session class k are allocated a reduced resource share, $\Delta_a(k)$, corresponding to the minimum resources share, $\Delta_{min}(k)$, plus an additional resource share which is proportional to the difference between the peak resource share, $\Delta_{peak}(k)$, and the minimum resource share, $\Delta_{min}(k)$, of session class k, as well as being proportional to $C_{additional}$.

In step 320, it is then checked whether the reduced resource share, $\Delta_a(k)$, allocated to sessions of session class k in step 315 is larger than the peak resource share for sessions of session class k, $\Delta_{peak}(k)$. If so, step 325 is entered, in which the resource share, $\Delta(k)$ allocated to sessions of session class k is set to the peak resource share, $\Delta_{peak}(k)$. If not, step 330 is entered, in which it is checked whether the counter k has reached the value K, i.e. if all session classes have been allocated a resource share $\Delta$. If so, the process is ended in step 340. If not, step 335 is entered, in which the counter k is incremented by 1. Step 315 is then entered with a new value of k, so that the allocated resource share, $\Delta(k)$, can be calculated for a new session class.

The method of FIG. 3 could include a step where it is checked, prior to entering step 315, whether the total amount of resources, $C_{total}$, is large enough for all admitted sessions to operate at their respective peak transmission rate, $R_{peak}$. If so, the respective peak resource share, $\Delta_{peak}(k)$, could be allocated to all sessions of all session classes, and the steps 315-335 would not have to be entered. In order to ensure that the relation used in step 315 does not give rise to any calculation problems, as would be the case if all ongoing sessions were fixed, the total amount of resources, $C_{total}$, could preferably be replaced, in FIG. 3, by the total amount of resources available to sessions of elastic classes. The total number of session classes, K, would then accordingly be replaced by the total number of elastic session classes. The resources necessary for transmission in sessions belonging to classes of fixed transmission rate could advantageously be allocated to such sessions prior to entering step 300.

Steps 320 and 325 of FIG. 3 are not necessary but could be omitted. However, if omitted, sessions of a session class may sometimes transmit at a higher transmission power than is required for transmission at the peak transmission rate of the session class, and hence causing an unnecessary high interference. Analogously, steps 235 and 240 could be omitted from the procedure illustrated in FIGS. 2a and 2b.

The resource allocating procedure of FIG. 3 calculates the resource share, Δ, to be allocated to a session of session class k when no session class is given priority over any other session classes. A similar procedure could be used in an embodiment of the invention where sessions are not grouped into session classes, but the resource share to be allocated is calculated separately for each session. However, by grouping the sessions into session classes and allocating the same amount of resources to all sessions belonging to the same session class, the amount of resources to be allocated will only have to be determined once per session, and less calculations will have to be made within the CDMA system 100.

The priority policies employed in the procedures illustrated in FIGS. 2 and 3, respectively, are examples only, and other priority policies could be used for allocating radio resources to sessions in dependency of the resource requirements of the other ongoing sessions in the cell 110. For example, in an embodiment wherein some elastic session classes are given priority over other elastic session classes, different levels of slow down can be applied, so that the slow down of the sessions in a low priority class is first made to a level so that the low priority class operates at a transmission rate lower than the peak transmission rate, but higher than the minimum transmission rate. If further slow down is required, sessions of higher priory classes can be somewhat slowed down, before the low priority class if further slowed down. Furthermore, the priority policy illustrated in FIG. 3 could be varied by introducing, to the second term on the right hand side of equation (9) used in step 315 of FIG. 3, a factor f(k) representing the priority of the session class k:

$$\Delta_a(k) = \Delta_{min}(k) + \frac{M(k)f(k)(\Delta_{peak}(k) - \Delta_{min}(k))}{\sum_{j=1}^{K}(M(j)f(k)(\Delta_{peak}(j) - \Delta_{min}(j)))} C_{additional} \quad (10)$$

The allocation of resources to sessions served by a base station 105 can advantageously be updated when the set up of a new session is requested from base station 105, either by initiation of a new session or by a session being handed over to the base station 105. In addition, the allocation of resources to ongoing sessions could advantageously be updated when a session served by base station 105 is terminated. The radio resources in a cell 110 will hence be optimally utilised at any time, and the resource share, Δ, allocated to a session within a cell 110 will at any time be based on the requirements of the other presently ongoing sessions within the cell 110.

The total amount of resources available for allocation, $C_{total}$, often depends on the ongoing sessions in neighbouring cells 110, served by other base stations 105, (cf. equation 7). The total amounted of resources available for allocation, $C_{total}$, could be advantageously be updated at regular intervals, and the allocation of resources to ongoing sessions could be updated upon such updating of $C_{total}$, so that any changes to $C_{total}$ can be accounted for in the allocation of resources.

As discussed above, the inventive method of sharing resources between elastic sessions can advantageously be applied in a CDMA network 100. Hardware and software for performing the allocation of resources in dependency of the resource requirements of ongoing sessions can advantageously be part of the radio network control node 140, or of a corresponding central node. Alternatively, hardware and software for performing the inventive method of allocating resources can be part of the radio base station 105.

Furthermore, the CDMA network 100 would preferably comprise hardware and software for transmitting information signals, relating to the allocation of resources, between a mobile station 125 and the CDMA network 100. In the following, it will be assumed that such signalling hardware and software, as well as the functionality for performing the resource allocation according to the invention, is implemented in the radio network control node 140. Needless to say, these functionalities could be implemented elsewhere in mobile radio system 100.

Figure 4A:
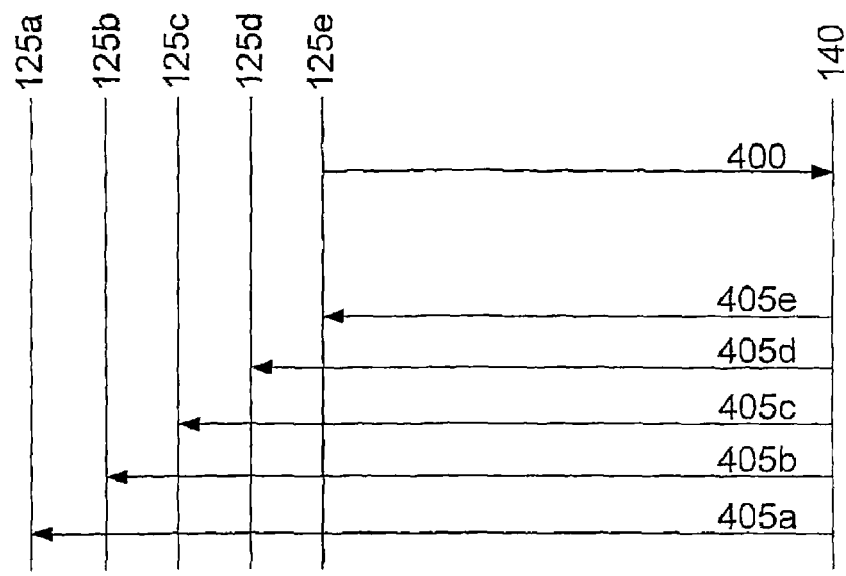
FIG. 4 is a signalling diagram illustrates signalling between a mobile radio network and mobile stations that are active within a cell upon exit of a session or entry of a new session in the cell.

FIG. 4a illustrates a scenario where initially four mobile stations, 125a, 125b, 125c, and 125d uphold ongoing sessions in a cell 110 controlled by a radio network control node 140. A fifth mobile station, mobile station 125e, sends a session request 400 to start a session of session class k. Radio network control node 140 then calculates the resource share Δ to be allocated to the mobile station 125e, based on the available resources in the cell 110 as well as the resource requirements of the sessions of mobile stations 125a-125e, as discussed above in relation to FIGS. 2 and 3. Since the arrival of a new session upheld by mobile station 125e may alter the resource share that should be allocated to one or more of mobile stations 125a-d, radio network control node 140 further re-calculates the resource shares allocated to mobile stations 125a, 125b, 125c and 125d, as discussed in relation to FIGS. 2 and 3. The new resource shares allocated to sessions of mobile stations 125a-125e are then communicated to mobile stations 125a-125e in allocation messages 405a-405e, respectively. However, if no changes are necessary to the resource share allocated to a session of a mobile station 125, the corresponding allocation message 405 does not have to be transmitted.

Figure 4B:
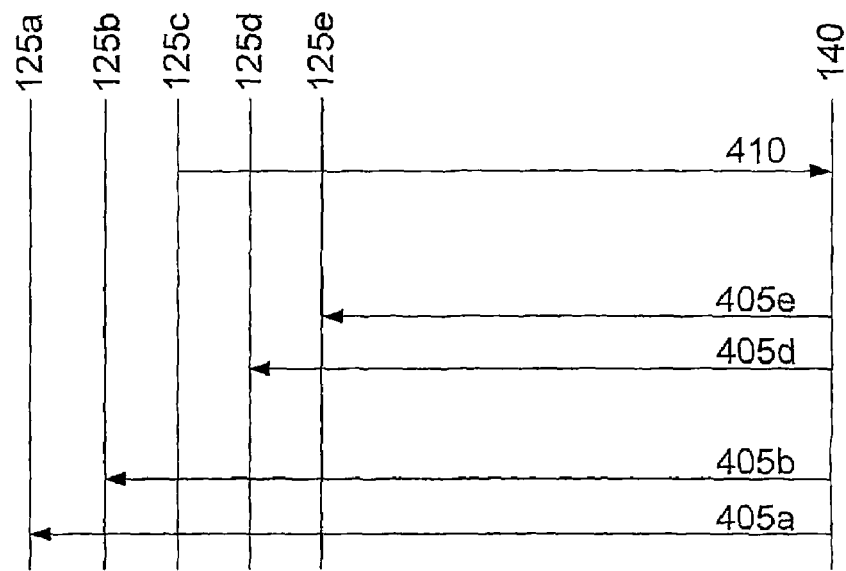

FIG. 4b. illustrates the scenario when five mobile stations 125a-125e are initially upholding sessions in a cell 110. Mobile station 125c then terminates its session and transmits a termination request 410 to the mobile radio network 100. The radio network control node 140 is triggered by the termination request 410 to update the radio resource allocation to the ongoing sessions upheld by mobile stations 125a, 125b, 125d and 125e, by executing a resource allocation procedure which takes into account the requirements of the other ongoing sessions, e.g. one of the resource allocation procedures illustrated in FIGS. 2 and 3. The new resource shares allocated to mobile stations 125a, 125b, 125d and 125e are then communicated to these mobile stations in messages 405a, 405b, 405d and 405e, respectively.

In some instances, a session may leave the cell 110 without the mobile station 125a sending a termination request 410. This could e.g. be the case when mobile station 125a enters a geographical area of poor radio coverage, or when the session is handed over to a different cell 110. Obviously, the resource allocation procedure could be initiated upon the detection of a session having left the cell 110, regardless of whether a termination request 410 has been received by the mobile radio system 100 or not.

In one embodiment of the invention, the resource allocation procedure is only executed upon entry of a new session into the cell 110, and not upon exit of a session.

The session request 400 should preferably comprise information from which the minimum and peak transmission rates, $R_{min}$ and $R_{peak}$, of the requested session are derivable. Such information could e.g. be information on the session class k to which the requested session belongs, or information on $R_{min}$ and $R_{peak}$.

An allocation message 405 could e.g. comprise information on the allocated resources as a resource share Δ, as a transmission rate R, as a slowdown rate a, or as a transmission power P. The relationship between these measures is given by equations 4-6 above. Although the resource share Δ discussed in the above relates to the power received from a mobile station 125 at the base station 105, the corresponding transmission power to be used by the mobile station 125 can be obtained by the mobile station 125 by measuring the received power on the downlink channel and comparing the received power to the actual power transmitted by the base station 105, if it is assumed that the path loss on the uplink and the downlink are the same. The message 405e, transmitted to the mobile station 125e requesting a new session, could be the same as the allocation messages 405a-405d, communicating a change in the allocation of resources, or could be different.

In order to execute the inventive resource allocation procedure, the radio resource control node 140 would need access to information on the total amount of resources available for allocation, $C_{total}$, and the number of ongoing sessions, M, in the cell 110, as well as the peak and minimum resource requirements of the ongoing sessions. This information could either be stored in the radio network control node 140 and be updated from time to time, or be communicated from the base station 105 each time the resource allocation procedure is to be executed. Furthermore, in a system which applies session classes, the radio network control node 140 would need access to information on the number of session classes, K, supported by base station 105.

Although for the sake of simplicity of illustration the mobile stations 125a-125e of FIGS. 4a and 4b are illustrated to uphold one session each, two or more sessions could be upheld by the same mobile stations 125. Updated resource shares allocated to two sessions upheld by the same mobile station 125 could be communicated in one message 405, or in one message 405 per session.

By the present invention is achieved that at a light traffic load in a cell of a mobile radio network, every ongoing session can operate at its peak transmission rate. When the traffic load in the cell increases so that every ongoing session cannot operate at its peak transmission rate, one or more of the ongoing sessions are slowed down to a transmission rate below the peak transmission rate, but only to the extent that is necessary. Hence, the utilization of radio resources of the mobile radio network can be optimised.

Although the above description mainly discusses the allocation of radio resources to session on the uplink channel, the method of allocating radio resources can also be applied to the downlink channel. When applying the method on the down link channel resource allocation, the total amount of resources available for allocation, $C_{total}$, is not restricted by the pole capacity, $C_{pole}$, but rather by the total transmission power of the base station 105.

Numerical results show that the utilization of radio resources is greatly improved by determining the slow down rates a in dependency f the resource requirements of the ongoing sessions in the cell 110. In FIGS. 5a-c, numerical results are shown obtained from studies of a model of a cell 110 which applies admission control, and in which sessions arrive according to a Poisson process of intensity λ with a mean holding time of 1/μ. The cell 110 used in the calculations supports sessions of three different session classes, which are referred to as class 1 (FIXED), which is a fixed session class, class 2 (ELA 1) which is an elastic session class, and class 3 (ELA 2) which is also an elastic session class. The numerical parameters of these session classes are given in Table 1, wherein Δ(2) represents the peak resource share of session class 2, $\Delta_{peak}(2)$, λ(2) is the arrival intensity of session class 2, and â(2) represents the maximum slowdown rate of session class 2, $a_{max}(2)$, Δ(3) represents the peak resource share of session class 3, etc. In the calculations presented in FIGS. 5a-5b, the numerical value of Δ in Table 1 is set of 0.049, the numerical value of λ is set to 29.26, and the numerical value of μ is set to 32.03 (which does not vary between session classes in the used cell model).

FIG. 5a illustrates calculated blocking probabilities plotted as a function of the slow down rate a of session class 3 for a system in which the slow down rates a of the elastic session classes do not depend on the transmission requirements of the ongoing sessions, but are fixed in all system states. Hence, the slow down rate of session classes 2 and 3 is set to the maximum slow down rate, and calculations have been performed for six different slow down rates of session class 3: $a(3)=a_{max}(3)=1, 2, 3, 4, 5$ and 6. The case illustrated in FIG. 5a corresponds to the allocation method disclosed in E. Altman, "*Capacity of Multi-Service Cellular Networks with Transmission-Rate Control: A Queuing Analysis*", ACM Mobicom '02, Atlanta, Ga., Sep. 23-28, 2002. The blocking probability is the probability of a new session arriving at the cell 110 being denied access by the admission control.

FIG. 5b illustrates calculated blocking probabilities plotted as a function of maximum slow down rate $a_{max}$ of session class 3, for a system in which the slow down rates a of the elastic session classes 2 and 3, a(2) and a(3), are determined according to the resource requirements of the ongoing sessions according to the priority policy illustrated in FIG. 2a. The maximum slow down rate of session class 2, $a_{max}(2)$, is kept fixed, whereas calculations have been performed for 6 different maximum slow down rates of session class 3: $a_{max}(3)=1, 2, 3, 4, 5$ and 6.

FIG. 5c illustrates the calculated blocking probabilities plotted as a function of the maximum slow down rate $a_{max}$ of session class 3, in the case where the slow down rates a of the elastic session classes 2 and 3, a(2) and a(3), are determined according to the resource requirements of the ongoing sessions according to the priority policy illustrated in FIG. 3. The maximum slow down rate of session class 2, $a_{max}(2)$, is kept fixed, whereas calculations have been performed for 6 different maximum slow down rates of session class 3: $a_{max}(3)=1, 2, 3, 4, 5$ and 6.

It is clear from the diagrams of FIGS. 5a-c that by employing a resource allocation method in which the slow down rate a of elastic sessions is determined in dependency of the resource requirements of the ongoing sessions, the blocking probabilities are greatly reduced for all session classes, and the utilization of radio resources is greatly improved. Further numerical results of the computations of the performance of the inventive method will be published in Gábor Fodor and M. Telek, "*Performance Analysis of the Uplink of a CDMA Cell Supporting Elastic Services*", Conference proceedings of the 2005 IFIP Networking Conference held at the University of Waterloo, Ontario, Canada, May 2-6, 2005, hereby incorporated by reference.

One skilled in the art will appreciate that the present invention is not limited to the embodiments disclosed in the accompanying drawings and the foregoing detailed description, which are presented for purposes of illustration only, but it can be implemented in a number of different ways, and it is defined by the following claims.

The invention claimed is:

1. A method of allocating radio resources to an elastic session, wherein a rate by which bits are transmitted can vary during an ongoing session, transmitted over a radio interface between a radio base station involved in a plurality of other ongoing sessions and a mobile station in a mobile radio network operating according to code division multiple access, the method comprising the steps of:
   allocating, to the elastic session, a radio resource share corresponding to a reduced transmission rate wherein the reduction in transmission rate corresponds to a peak transmission rate of the elastic session, which is the maximum transmission rate at which the elastic session can operate, being slowed down by a first slowdown rate;
   determining the first slow down rate in dependency of the transmission rate requirements of the ongoing sessions in a manner so that the radio resource share allocated is not lower than a radio resource share corresponding to the maximum transmission rate if a total amount of resources available for the radio base station to allocate to ongoing sessions is sufficient for all ongoing sessions to transmit at a respective peak transmission rate;
   wherein the elastic session belongs to one of at least two session classes;
   wherein the first slow down rate is determined in accordance with a priority policy according to which different session classes are given different priority and sessions of a higher priority class are allocated radio resources corresponding to a reduced transmission rate only if a reduction of transmission rate of sessions of session classes of lower priority is not sufficient;
   wherein the same amount of resources are allocated to all sessions belonging to the same session class, and
   wherein each ongoing session is associated with a peak transmission rate, and the allocating of resources to the elastic session is performed upon an indication indicating that a total amount of resources available for allocating to ongoing sessions is not sufficient for all ongoing sessions to operate at their respective peak transmission rate.

2. The method of claim 1, wherein the determining further comprises
   ensuring that the reduced transmission rate is not lower than a minimum transmission rate of the elastic session.

3. The method of claim 2, wherein the elastic session is a real-time session.

4. The method of claim 1, wherein
   the first slow down rate is determined in accordance with a priority policy according to which, if a total amount of resources available for allocation to sessions involving the radio base station is not sufficient for each ongoing session to transmit at its peak transmission rate, the transmission rate of each ongoing session is slowed down with a slow down rate.

5. The method of claim 1, wherein
   the allocating of resources to the elastic session is performed upon the entry of a new session involving the radio base station.

6. The method of claim 1, wherein
   the allocating of resources to the elastic session is performed upon the exit of an ongoing session.

7. The method of claim 1, wherein
   the allocating of resources to the elastic session is performed in response to an indication indicating that a total amount of resources available for allocation to ongoing sessions involving the radio base station has changed.

8. The method of claim 1, wherein the elastic session is a voice call.

9. A non-transitory computer-readable storage medium with an executable computer program stored thereon, where the program instructs a computer to allocate radio resources to an elastic session, wherein a rate by which bits are transmitted can vary during an ongoing session, transmitted over a radio interface between a radio base station involved in a plurality of other ongoing sessions and a mobile station in a mobile radio network operating according to code division multiple access by:
   allocating, to the elastic session, a radio resource share corresponding to a reduced transmission rate wherein the reduction in transmission rate corresponds to a peak transmission rate of the elastic session, which is the maximum transmission rate at which the elastic session can operate, being slowed down by a first slowdown rate;
   determining the first slow down rate in dependency of the transmission rate requirements of the ongoing sessions in a manner so that the radio resource share allocated is not lower than a radio resource share corresponding to the maximum transmission rate if a total amount of resources available for the radio base station to allocate to ongoing sessions is sufficient for all ongoing sessions to transmit at a respective peak transmission rate;
   wherein the elastic session belongs to one of at least two session classes;
   wherein the first slow down rate is determined in accordance with a priority policy according to which different session classes are given different priority and sessions of a higher priority class are allocated radio resources corresponding to a reduced transmission rate only if a reduction of transmission rate of sessions of session classes of lower priority is not sufficient;
   wherein the same amount of resources are allocated to all sessions belonging to the same session class; and
   wherein each ongoing session is associated with a peak transmission rate, and the allocating of resources to the elastic session is performed upon an indication indicating that a total amount of resources available for allocating to ongoing sessions is not sufficient for all ongoing sessions to operate at their respective peak transmission rate.

10. The non-transitory computer-readable storage medium of claim 9, wherein the elastic session is a voice call.

11. A radio network node for allocating radio resources to sessions in a mobile radio network operating according to code division multiple access, the radio network node comprising:
   a computer arrangement arranged to execute a computer program product comprising computer program code means operable to, when run on a computer, execute a method for allocating radio resources to an elastic session, wherein a rate by which bits are transmitted can vary during an ongoing session, transmitted over a radio interface between the radio network node involved in a plurality of other ongoing sessions and a mobile station in the mobile radio network, the computer arrangement operable to:
   allocating, to the elastic session, a radio resource share corresponding to a reduced transmission rate wherein the reduction in transmission rate corresponds to a peak transmission rate of the elastic session, which is the maximum transmission rate at which the elastic session can operate, being slowed down by a first slowdown rate;

determining the first slow down rate in dependency of the transmission rate requirements of the ongoing sessions in a manner so that the radio resource share allocated is not lower than a radio resource share corresponding to the maximum transmission rate if a total amount of resources available for the radio base station to allocate to ongoing sessions is sufficient for all ongoing sessions to transmit at a respective peak transmission rate;

wherein the elastic session belongs to one of at least two session classes;

wherein the first slow down rate is determined in accordance with a priority policy according to which different session classes are given different priority and sessions of a higher priority class are allocated radio resources corresponding to a reduced transmission rate only if a reduction of transmission rate of sessions of session classes of lower priority is not sufficient;

wherein the same amount of resources are allocated to all sessions belonging to the same session class; and wherein each ongoing session is associated with a peak transmission rate, and the allocating of resources to the elastic session is performed upon an indication indicating that a total amount of resources available for allocating to ongoing sessions is not sufficient for all ongoing sessions to operate at their respective peak transmission rate.

12. The radio network node of claim 11, wherein the elastic session is a voice call.

13. A mobile radio network operating according to code division multiple access comprising:

a radio network node for allocating radio resources to sessions, comprising:

a computer arrangement arranged to execute a computer program product comprising computer program code means operable to, when run on a computer, execute a method of allocating radio resources to an elastic session, wherein a rate by which bits are transmitted can vary during an ongoing session, transmitted over a radio interface between the radio network node involved in a plurality of other ongoing sessions and a mobile station in the mobile radio network, the computer arrangement operable to:

allocating, to the elastic session, a radio resource share corresponding to a reduced transmission rate wherein the reduction in transmission rate corresponds to a peak transmission rate of the elastic session, which is the maximum transmission rate at which the elastic session can operate, being slowed down by a first slowdown rate;

determining the first slow down rate in dependency of the transmission rate requirements of the ongoing sessions in a manner so that the radio resource share allocated is not lower than a radio resource share corresponding to the maximum transmission rate if a total amount of resources available for the radio base station to allocate to ongoing sessions is sufficient for all ongoing sessions to transmit at a respective peak transmission rate;

wherein the elastic session belongs to one of at least two session classes;

wherein the first slow down rate is determined in accordance with a priority policy according to which different session classes are given different priority and sessions of a higher priority class are allocated radio resources corresponding to a reduced transmission rate only if a reduction of transmission rate of sessions of session classes of lower priority is not sufficient;

wherein the same amount of resources are allocated to all sessions belonging to the same session class; and wherein each ongoing session is associated with a peak transmission rate, and the allocating of resources to the elastic session is performed upon an indication indicating that a total amount of resources available for allocating to ongoing sessions is not sufficient for all ongoing sessions to operate at their respective peak transmission rate.

14. The mobile radio network of claim 13, wherein the elastic session is a voice call.

15. A method of allocating radio resources to multiple elastic sessions between a radio base station and multiple mobile stations in a mobile radio network operating according to code division multiple access, the method comprising the steps of:

allocating, for each of the multiple elastic sessions, a radio resource share corresponding to a reduced transmission rate wherein the reduction in transmission rate corresponds to a peak transmission rate of the corresponding elastic session, which is the maximum transmission rate at which the corresponding elastic session can operate even if more radio resources are available, being slowed down by a first slowdown rate;

determining the first slow down rate in dependency of the transmission rate requirements of the other multiple elastic sessions in a manner so that the radio resource share allocated is not lower than a radio resource share corresponding to the maximum transmission rate if a total amount of resources available for the radio base station to allocate to the other multiple elastic sessions is sufficient for all of the elastic sessions to transmit at a respective peak transmission rate;

wherein the corresponding elastic session belongs to one of at least two session classes;

wherein the first slow down rate is determined in accordance with a priority policy according to which different session classes are given different priority and sessions of a higher priority class are allocated radio resources corresponding to a reduced transmission rate only if a reduction of transmission rate of sessions of session classes of lower priority is not sufficient;

wherein the multiple elastic sessions include both non-real time elastic sessions and real-time elastic sessions, wherein the non-real time elastic sessions have a fixed amount of data to be transferred and for which a slowdown results in a longer holding time, wherein the real-time elastic sessions have a transmission rate that when reduced is at an expense of quality of service but does not affect holding time, and wherein the non-real time elastic sessions includes data transfer sessions and the real-time elastic sessions includes voice and video sessions; and wherein each ongoing session is associated with a peak transmission rate, and the allocating of resources to the elastic session is performed upon an indication indicating that a total amount of resources available for allocating to ongoing sessions is not sufficient for all ongoing sessions to operate at their respective peak transmission rate.

* * * * *